March 21, 1961 F. F. MILLER, JR 2,976,091
UNIVERSAL JOINT
Filed May 14, 1956 2 Sheets-Sheet 1

INVENTOR.
FRED F. MILLER JR.
BY
ATTORNEYS

INVENTOR.
FRED F. MILLER JR.

ATTORNEYS

United States Patent Office 2,976,091
Patented Mar. 21, 1961

2,976,091
UNIVERSAL JOINT
Fred F. Miller, Jr., Berkley, Mich., assignor, by mesne assignments, to Dana Corporation, Toledo, Ohio, a corporation of Virginia
Filed May 14, 1956, Ser. No. 584,853
6 Claims. (Cl. 308—212)

The invention relates to universal joints of that type in which the rotary members are connected by bifurcations thereon embracing and pivotally connected in transverse planes to a cross trunnion member. Usually there are separate roller bearings for forming each of the pivotal connections and these are usually cup shaped to fit over the ends of the trunnions and externally engage apertures in the furcations. A sealing ring surrounds the trunnion at the inner end of the cup to retain the lubricant therein and to protect entry of dirt or other matter from the outside. For convenience in shipment the joint may be disassembled but the roller bearings are retained on the trunnions of the cross member. This requires some means of securing them in such relation other than the furcations of the rotary members.

It is one of the objects of the invention to provide a simple means for holding the bearings on the trunnions when detached from the bifurcated rotary members. It is a further object to provide a sealing means for the cupped bearings which effectively prevents entrance thereinto of foreign matter without preventing outward passage of displaced air and the old lubricant during pressure lubrication. With these and other improved features in view the invention consists in the construction as hereinafter set forth.

Figure 1:
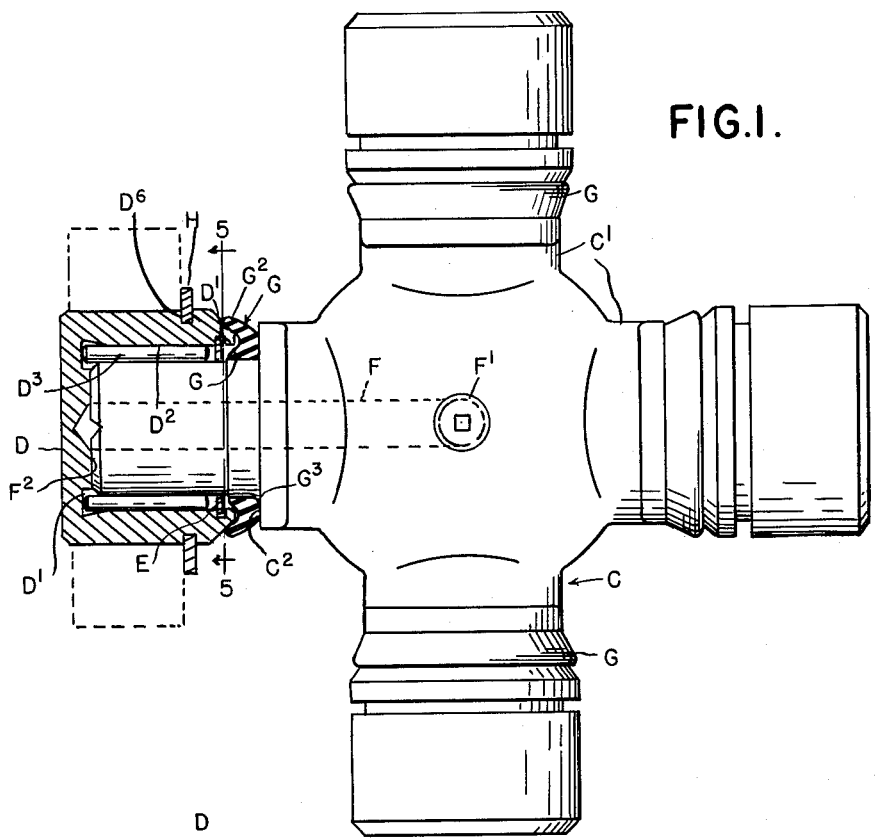
Fig. 1 is an elevation of the cross trunnion member detached from the rotary members but with the cupped roller bearings engaged with and secured to the trunnions, one of these bearings being in section.
Figure 2:
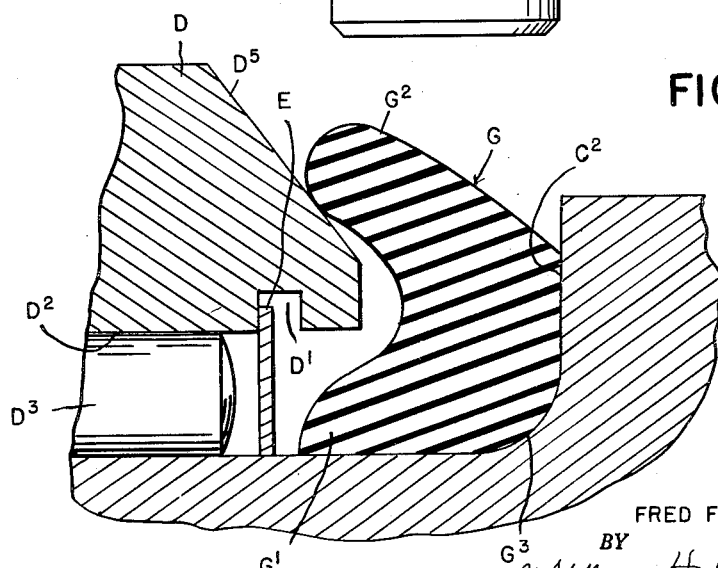
Fig. 2 is an enlarged view of a portion of Fig. 1.
Figure 3:
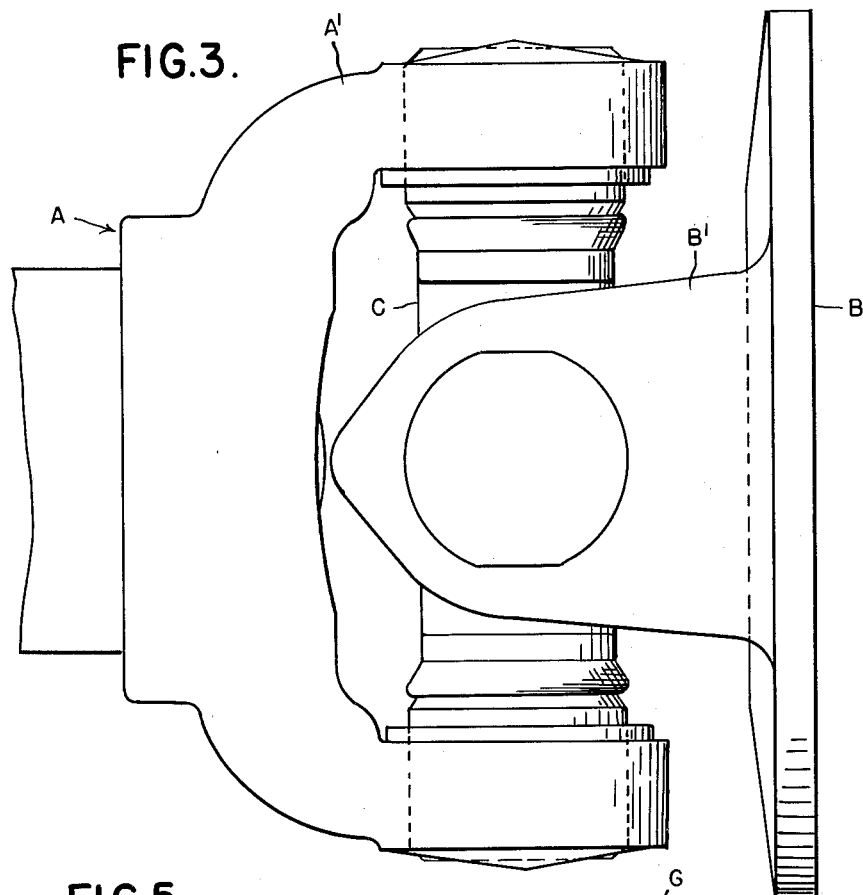
Fig. 3 is a side elevation of the assembled universal joint.
Figure 5:
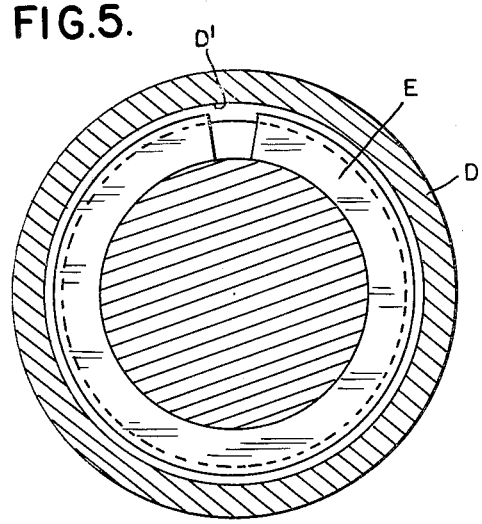
Fig. 5 is a section taken on line 5—5 of Fig. 1.
Figure 4:
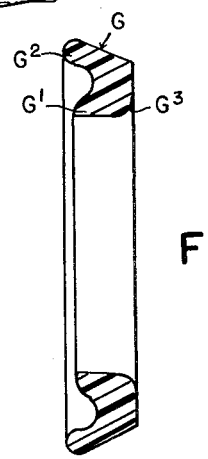
Fig. 4 is a cross section through the sealing ring.

As shown in Fig. 3, A and B are rotary members having bifurcated portions A' and B' for engagement with a cross trunnion member C, the construction being generally the same as heretofore manufactured and used. Each of the separate trunnions C' of the trunnion member C has engaged therewith a cupped roller bearing member D, preferably the so-called needle bearing. These bearings when the joint is assembled engage apertures in the furcations A' and B' to which they are secured. In the assembled joint each bearing is engaged with an aperture in one of the furcations, but during assembly the cross trunnion member is first engaged with said apertures, after which the bearings are introduced from outside the furcations and secured in such position.

As above stated, before complete assembly of the joint the bearing members D are engaged with their respective trunnions of the cross trunnion member and remain in such position during shipment of the parts. It is, however, necessary to provide some means for holding the bearings in such position. I have devised a very simple means for this purpose which consists in a resilient snap ring E biased for clamping engagement with the trunnion but which is first assembled with the bearing D by snap engagement with an internal annular groove D' therein.

More in detail the bearing D has an inner annular race surface $D^2$ for externally engaging the needle rollers $D^3$ which latter extend from the closed end $D^4$ of the cup to near the inner open end thereof. The groove D' is located slightly beyond the inner ends of the rollers and is large enough in cross section not to bind upon the snap ring E. However, this ring E will be clamped upon the trunnion C' with sufficient friction to hold the bearing D thereon when detached from the furcation of the member A or B. The snap ring also serves to hold the rollers in the bearing cup when the cup is disengaged from bearing trunnion C' of cross member C. This construction does not increase the manufacturing cost of the bearing while the cost of the snap ring is negligible.

Another feature of my invention is as above stated the construction of sealing means for excluding entrance of any foreign matter into the bearing and for retaining the lubricant therein. The lubricant is introduced into each bearing through a channel F through the axis of the trunnion communicating at its inner end with a common channel F' for all the trunnions which extend axially of the member C. From the channel F the lubricant passes through radial channels $F^2$ at the end of the trunnions into the space occupied by the rollers $D^3$. It is, therefore, necessary that the sealing means at the inner ends of the rollers should permit of displacement of air and old lubricant by the new lubricant without destroying their sealing characteristic against entrance of any material from the outside. It must also be remembered that when the joint is in action the sealing means must resist displacement by centrifugal force or any other disturbing stresses. My improved sealing means comprises a ring G formed of a resilient plastic, such as neoprene, which snugly fits over the trunnion C' and bears against a shoulder $C^2$ thereon. In cross section the ring is U-shaped with portions G' and $G^2$, respectively, extending inside and outside the inner end of the cupped bearing D. The latter is tapered at its inner end to form the conical outer surface $D^5$ over and against which the portion $G^2$ of the ring is pressed. In fact, this portion $G^2$ is displaced by the surface $D^5$ in the assembled position of the parts and is thus biased to press against said surface. The inner portion G' extends into fairly close proximity to the ring E, while the outer surface of the U, $G^3$, bears against a correspondingly shaped surface of the shoulder $C^2$. With such construction sealing against entrance of material from the outside will be maintained in spite of centrifugal force or other stresses. However, when the joint is lubricated, as previously described, a small quantity of the lubricant may pass outward by the portion $G^2$, thus indicating that the lubrication is complete.

When the joint is in use the friction of the ring E on the trunnion is not sufficient to be relied upon in holding the bearing D from displacement. Any suitable means may be used for this purpose but, as shown, each bearing D is formed with an annular groove $D^6$ in the portion of its outer surface which extends inside of the furcation A' or B'. A snap ring H is engaged with this groove and forms a shoulder for bearing against the furcation, thereby preventing outward movement of the bearing on the trunnion.

What I claim as my invention is:

1. In a bearing assembly of the type including a trunnion having a substantially smooth outer surface and a trunnion bearing, means for holding the bearing on the smooth outer surface of the trunnion during shipping and installation, comprising a portion of the bearing surrounding and spaced from the trunnion having a circumferential groove in its inner surface, and a resilient snap ring biased to engage said groove and to clamp upon the smooth outer surface of the trunnion adapted to frictionally hold the bearing from displacement.

2. The construction as in claim 1 in which said resilient snap ring when engaged with said groove is adapted to be forced onto the trunnion over said smooth outer surface from the outer end thereof against the friction which, however, is sufficient to retain the bearing from displacement.

3. The construction as in claim 2 in which the bearing is a roller bearing and said groove is in a portion of the outer race member which extends axially inward beyond the rollers.

4. In a trunnion and bearing assembly, a trunnion having a substantially smooth outer surface, a bearing adapted to fit over said smooth outer surface of said trunnion in assembly and having an inner surface adjacent said smooth outer surface of said trunnion, a circumferential groove in said inner surface of said bearing, and a snap ring positioned within said groove having an outer diameter greater than the inner diameter of said bearing and an inner diameter slightly less than the outer diameter of said trunnion for frictionally retaining said bearing in assembled position on said trunnion.

5. In a trunnion and bearing assembly, a trunnion having a substantially smooth outer surface, a bearing adapted to fit over said smooth outer surface of said trunnion in assembly and having an inner surface adjacent said smooth outer surface of said trunnion, and a resilient snap ring carried by said bearing in concentric relation therewithin, said snap ring having an inner diameter normally slightly less than the outer diameter of said trunnion to clamp upon the smooth outer surface of said trunnion and thereby frictionally retain said bearing in assembled position on said trunnion.

6. In a trunnion and bearing assembly, a trunnion having a substantially smooth outer surface, a bearing adapted to fit over said smooth outer surface of said trunnion in assembly and having an inner surface adjacent said smooth outer surface of said trunnion, and a resilient transversely split snap ring within and concentric with said bearing, said bearing having means supporting said snap ring for slightly expansion and contraction and said snap ring having an inner diameter slightly less than the outer diameter of said trunnion to clamp upon the smooth outer surface of said trunnion and frictionally retain said bearing in assembled position on said trunnion.

References Cited in the file of this patent

UNITED STATES PATENTS

| | | |
|---|---|---|
| 2,124,803 | Wollner | July 26, 1938 |
| 2,198,376 | Cederberg | Apr. 23, 1940 |
| 2,265,554 | Thomas | Dec. 9, 1941 |
| 2,427,449 | Dunn | Sept. 16, 1947 |
| 2,452,352 | Booth | Oct. 26, 1948 |
| 2,467,099 | Smith | Apr. 12, 1949 |
| 2,568,056 | Corder | Sept. 18, 1951 |
| 2,657,104 | Kayser | Oct. 27, 1953 |
| 2,698,527 | Anderson | Jan. 4, 1955 |
| 2,718,441 | Smith | Sept. 20, 1955 |
| 2,794,693 | Burkhalter et al. | June 4, 1957 |